US010440204B2

(12) United States Patent
Kawatsu (10) Patent No.: US 10,440,204 B2
(45) Date of Patent: Oct. 8, 2019

(54) IMAGE READING APPARATUS AND IMAGE FORMING SYSTEM

(71) Applicant: KONICA MINOLTA, INC., Chiyoda-ku, Tokyo (JP)

(72) Inventor: Kenji Kawatsu, Kodaira (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 15/900,238

(22) Filed: Feb. 20, 2018

(65) Prior Publication Data

US 2018/0278762 A1 Sep. 27, 2018

(30) Foreign Application Priority Data

Mar. 22, 2017 (JP) ................... 2017-055957

(51) Int. Cl.
*H04N 1/00* (2006.01)
*G03G 15/00* (2006.01)
(Continued)

(52) U.S. Cl.
CPC ..... *H04N 1/00323* (2013.01); *G03G 15/5062* (2013.01); *H04N 1/00557* (2013.01);
(Continued)

(58) Field of Classification Search
CPC .......... H04N 1/00323; H04N 1/00798; H04N 1/00981; H04N 1/60; H04N 1/00557;
(Continued)

(56) References Cited

U.S. PATENT DOCUMENTS 8,970,924 B2 3/2015 Nakaie
2009/0268437 A1* 10/2009 Mabuchi ................. F21S 13/00
362/159
(Continued)

FOREIGN PATENT DOCUMENTS

JP 2008162775 A 7/2008
JP 2010062712 A 3/2010
JP 2013207613 A 10/2013

OTHER PUBLICATIONS

Japanese Office Action dated Mar. 12, 2019 (and English translation thereof) issued in Japanese Application No. 2017-055957.

*Primary Examiner* — Neil R McLean
*Assistant Examiner* — Darryl V Dottin
(74) *Attorney, Agent, or Firm* — Holtz, Holtz & Volek PC (57) ABSTRACT

An image reading apparatus includes: a paper path; an image reader which reads a side of the sheet conveyed along the paper path in a reading position; a sheet support member located opposite to the image reader to support a rear surface opposite to a surface to be read of the sheet; a spectrophotometer which colorimetrically measures color of an image formed on the sheet; and an image reading housing which accommodates the image reader and the spectrophotometer. The image reader includes: a reading housing; and a drawer guide provided in the reading housing such that it can be drawn from the image reading housing, and maintains the distance between a light transmitting member housed in the reading housing and the sheet support member to be greater than a reading distance lower limit. The drawer guide transfers heat to the outside of the reading housing.

15 Claims, 5 Drawing Sheets

(51) Int. Cl.
  *H04N 1/60* (2006.01)
  *H04N 1/40* (2006.01)
(52) U.S. Cl.
  CPC ..... *H04N 1/00798* (2013.01); *H04N 1/00981* (2013.01); *H04N 1/40* (2013.01); *H04N 1/60* (2013.01); *G03G 2215/047* (2013.01); *G03G 2221/1651* (2013.01)
(58) Field of Classification Search
  CPC ....... G03G 15/5062; G03G 2221/1651; G03G 2215/047
  USPC ........................................................ 358/1.15
  See application file for complete search history.

(56) References Cited

U.S. PATENT DOCUMENTS

2013/0258421 A1    10/2013  Nakaie
2017/0277100 A1*    9/2017  Xu ........................ G03G 15/607

* cited by examiner

IMAGE READING APPARATUS AND IMAGE FORMING SYSTEM

The entire disclosure of Japanese Patent Application No. 2017-055957 filed on Mar. 22, 2017 is incorporated herein by reference in its entirely.

BACKGROUND

Technological Field

The present disclosure relates to an image reading apparatus and an image forming system.

Description of the Related Art

In the past, it has been proposed to design an image reading apparatus in such a structure as to make it easy to detach and attach a contact image sensor which is provided in the bottom surface of a sheet feed tray for the purpose of facilitating the procedure of handling jammed sheets or various maintenance work of an image reader and the like (for example, refer to Japanese Unexamined Patent Application Publication No. 2010-062712).

SUMMARY

However, the prior art technique described in Japanese Unexamined Patent Application Publication No. 2010-062712 is related to the structure in which a contact image sensor can easily be detached by rotating a sheet feed tray, rather than the structure in which various maintenance work can be conducted by pulling out an image reader. On the other hand, in a position above a paper passing path, a sheet support member for reflecting light radiated from the image reader is provided to face the reading position of the image reader. Accordingly, when the image reader is pulled out for maintenance, there is a fear that the image reader is lowered by its weight. When the image reader is lowered, the space between the image reader and the sheet support member becomes narrow so that the image reader may come in contact with the sheet support member depending upon the lowering amount. If the image reader comes in contact with the sheet support member, flaws or the like may be formed on the image reader so that the maintenance of the image reader is not easy by pulling out the image reader.

Also, in the case where a spectrophotometer is installed in addition to the image reader, the spectrophotometer may be affected by heat generated when being irradiated with light from the image reader. The colorimetric measurement result of a spectrophotometer is changed by the influence of thermochromism which is a phenomena in which color is changed due to a change in temperature such as sheet temperature or ambient temperature of a sheet during colorimetric measurement. Accordingly, if the colorimetric measurement result of the spectrophotometer is affected by heat of the image reader, the spectrophotometer cannot maintain colorimetric accuracy.

Namely, in the case of the prior art technique, it is impossible to maintain colorimetric accuracy of a spectrophotometer and facilitate maintenance of an image reader.

Taking into consideration the above circumstances, it is an object of the present disclosure therefore to maintain colorimetric accuracy of a spectrophotometer and facilitate maintenance of an image reader.

To achieve at least one of the abovementioned objects, according to one aspect of the present disclosure, an image reading apparatus which reads a sheet, comprises: a paper path along which the sheet is conveyed. an image reader which reads at least either one of front and back sides of the sheet conveyed along the paper path in a reading position; a sheet support member which is located opposite to the image reader to support a rear surface opposite to a surface to be read of the sheet; a spectrophotometer which colorimetrically measures color of an image formed on the sheet; and an image reading housing which accommodates the image reader and the spectrophotometer. The image reader comprises: a reading housing; a light transmitting member which is housed in the reading housing, and located in a position opposite to the sheet in the reading position to transmit illumination light radiated from the image reader to the sheet and transmit incident light including reflected light which is reflected from the sheet; and a drawer guide which is provided in the reading housing such that it can be drawn from the image reading housing, and maintains the distance between the light transmitting member and the sheet support member to be greater than a reading distance lower limit, wherein the drawer guide transfers heat, which is generated when radiating the illumination light, to the outside of the reading housing.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE EMBODIMENTS

Hereinafter, one or more embodiments of the present disclosure will be described with reference to the drawings. However, the scope of the present disclosure is not limited to the disclosed embodiments. Incidentally, as used in the detailed description of the embodiments, the terms "comprise," "consist of," "include," "including," "have," "incorporate," and any synonyms thereof, are intended to cover a non-exclusive inclusion. For example, a process, method, article, or apparatus that comprises a list of elements is not necessarily limited only to those elements, but may include other elements not expressly listed or inherent to such process, method, article, or apparatus. Furthermore, unless otherwise specifically indicated, the term "or" represents "inclusive or" but does not means "exclusive or". For example, "condition A or condition B" is true in any of the case that condition A is true and condition B is false, the case that condition A is false and condition B is true, and the case that condition A is true and condition B is true.

Embodiment 1

Figure 1:
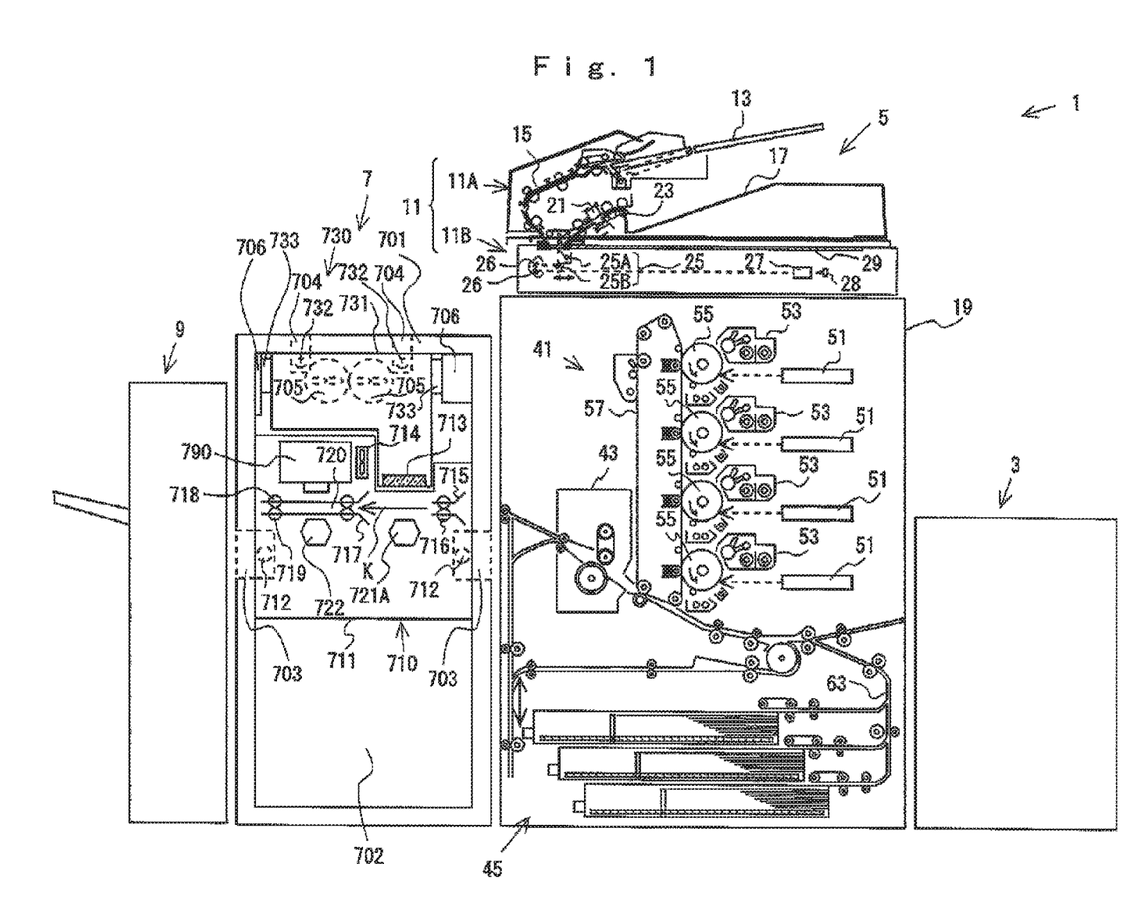
FIG. 1 is a schematic view for showing an example of the overall configuration of an image forming system 1 in accordance with an embodiment 1 of the present disclosure.
Figure 2:
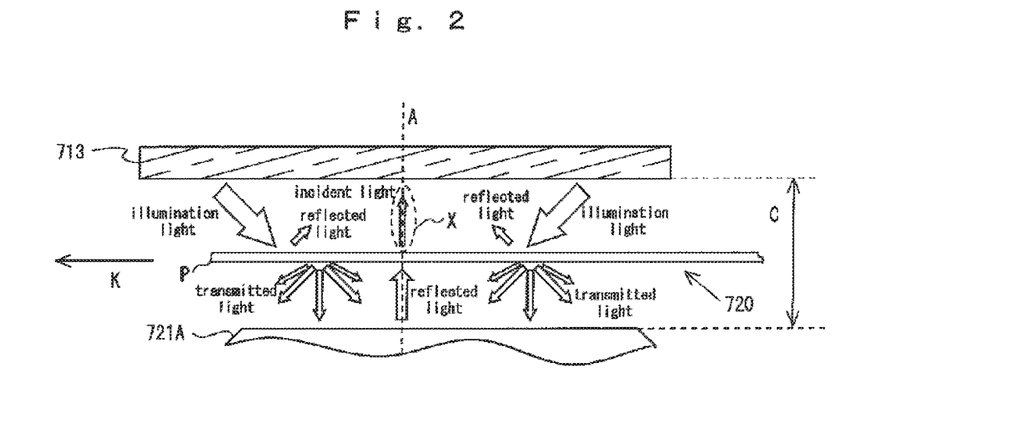
FIG. 2 is a view for briefly explaining an light quantity X in accordance with the embodiment 1.
Figure 3:
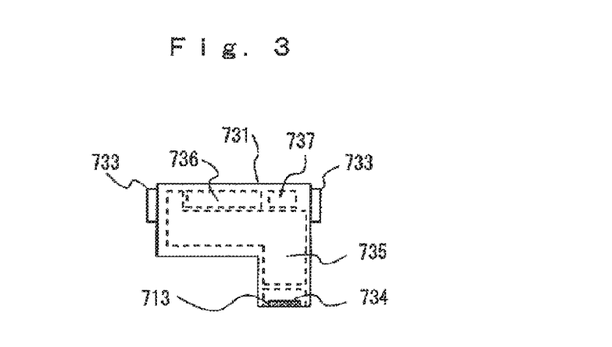
FIG. 3 is a schematic view for showing an example of the internal structure of an image reader 730 in accordance with the embodiment 1.
Figure 4:
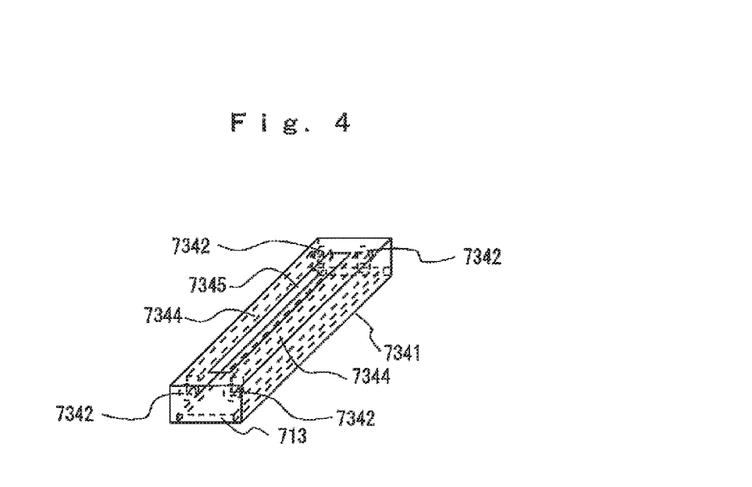
FIG. 4 is a schematic view for showing an example of the structure of a lighting device 734 of the image reader 730 in accordance with the embodiment 1.
Figure 5:
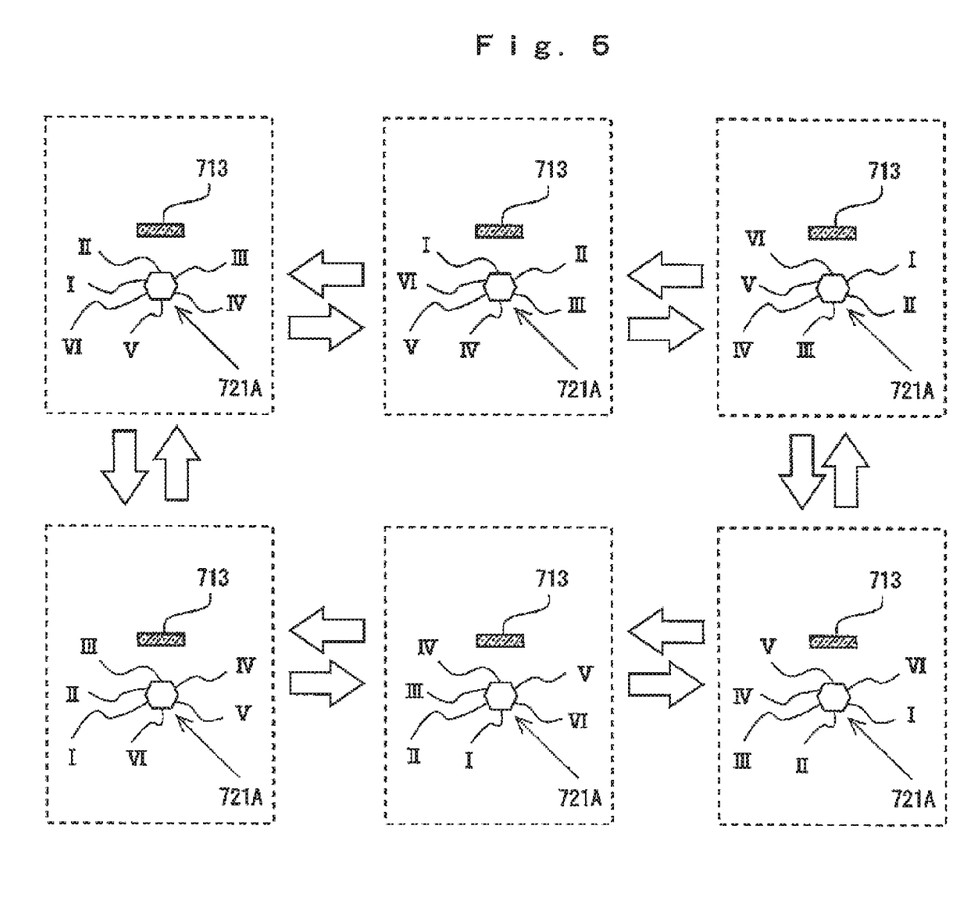
FIG. 5 is a view for explaining an usage example of a sheet support member 721A in accordance with the embodiment 1.
Figure 6:
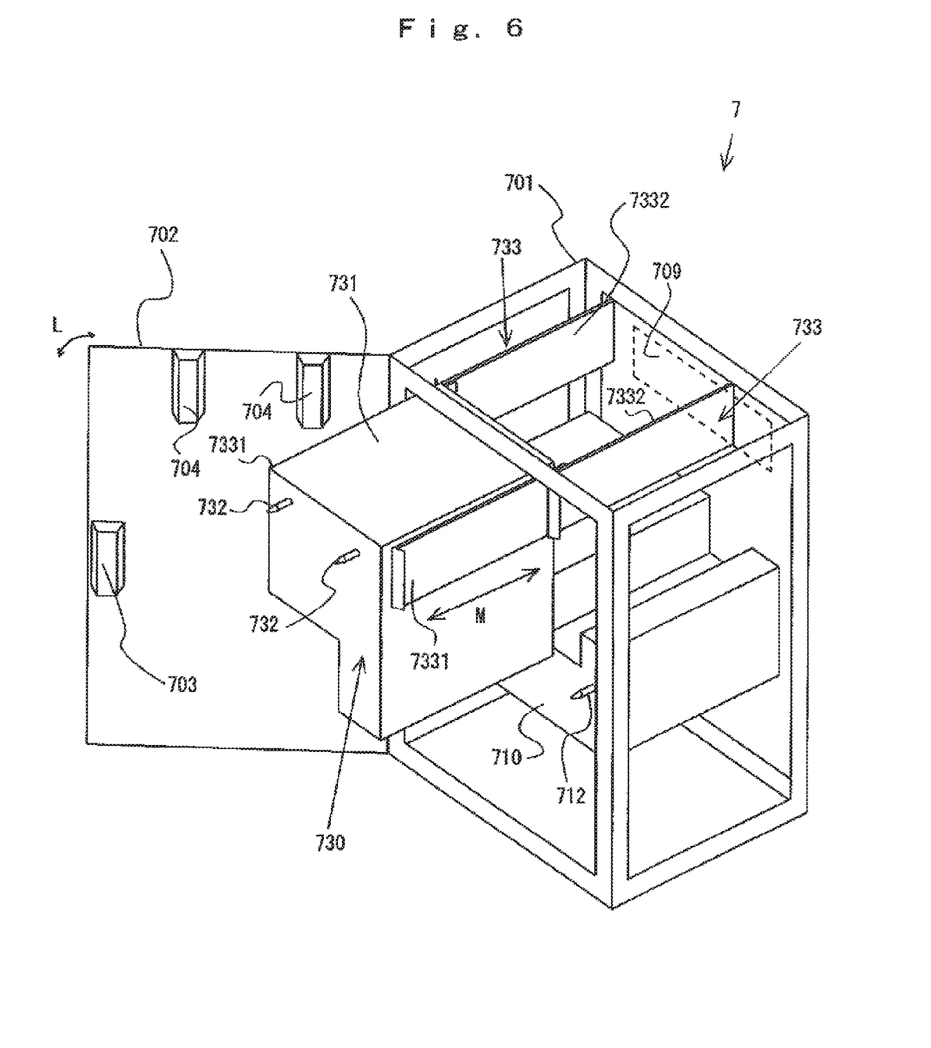
FIG. 6 is a schematic view for showing an image reading apparatus 7 from which the image reader 730 is pulled out in accordance with the embodiment 1.

FIG. 1 is a schematic view for showing an example of the overall configuration of an image forming system 1 in accordance with an embodiment 1 of the present disclosure. FIG. 2 is a view for briefly explaining an light quantity X in accordance with the embodiment 1. FIG. 3 is a schematic view for showing an example of the internal structure of an image reader 730 in accordance with the embodiment 1. FIG. 4 is a schematic view for showing an example of the structure of a lighting device 734 of the image reader 730 in accordance with the embodiment 1. FIG. 5 is a view for explaining an usage example of a sheet support member 721A in accordance with the embodiment 1. FIG. 6 is a schematic view for showing an image reading apparatus 7 from which the image reader 730 is pulled out in accordance with the embodiment 1.

The image forming system 1 includes a paper feed apparatus 3, an image forming apparatus 5, the image reading apparatus 7 and a finisher 9. The paper feed apparatus 3 accommodates sheets P having different sizes. The paper feed apparatus 3 conveys the accommodated sheets P to the image forming apparatus 5. The finisher 9 performs post-printing processes such as punching through a sheet P on which an image is formed. Also, the finisher 9 may perform post-printing processes such as eliminating static electricity from a sheet P on which an image is formed.

The image forming apparatus 5 is provided with an image reader 11 and an image forming apparatus body 19. The image reader 11 is provided with an ADF 11A and an original reading unit 11B. The ADF 11A is provided with an original tray 13, a paper path 15, a catch tray 17, a contact image sensor 21, a density reference member 23 and the like. The density reference member 23 is used to perform shading compensation of the ADF 11A. The original reading unit 11B is provided with an original illuminating unit 25, a reflection mirror 26, a condenser lens 27, a sensor 28, a platen glass 29 and the like. The image reading unit 11 separates and delivers originals set on the original tray 13 one by one, conveys the originals in the subscanning direction along the paper path 15 on which the contact image sensor 21 is arranged, and discharges the originals onto the catch tray 17. The original illuminating unit 25 is provided with a lamp 25A and a mirror 25B. While an original is conveyed in the subscanning direction along the paper path 15, an reading operation is repeatedly performed on a line-by-line basis in the main scanning direction with the original illuminating unit 25, the reflection mirror 26, the condenser lens 27 and the sensor 28.

The image forming apparatus body 19 is provided with an image forming unit 41, a fixing unit 43, a paper feed unit 45 and the like. The image forming unit 41 is provided with exposing devices 51, development apparatuses 53, photoreceptor drums 55 and a transfer belt 57. The image forming unit 41 supplies different color toners to the photoreceptor drums 55 for development with the exposing devices 51 based on image data of an original which is read by the image reading unit 11. The image forming unit 41 transfers toner images developed on the photoreceptor drums 55 to a sheet P, which is supplied from the paper feed unit 45, through the transfer belt 57. The image forming unit 41 fixes a color image on the sheet P by melting the toner images transferred to the sheet P with the fixing unit 43.

The image reading apparatus 7 is arranged in the downstream side of the image forming apparatus 5 in an in-line fashion and reads an image printed on one or both side of a sheet P. Specifically, the image reading apparatus 7 obtains correction amounts of an image printed on a sheet P based on the reading results such as the color, position, magnification factor and the like of the image. The correction amounts of the image are fed back to the image forming apparatus 5. Incidentally, while the following explanation is based on the assumption that an in-line system is used for arranging the image reading apparatus 7, it is possible to arrange the image reading apparatus 7 in the downstream side of the image forming apparatus 5 in accordance with an offline system.

The image reading apparatus 7 is provided with an image reading housing 701, a conveyance unit 710, the image reader 730 and the like. The image reading housing 701 accommodates the image reader 730 and the conveyance unit 710. The image reading housing 701 is provided with a door 702 which can be opened and closed in an opening and closing direction L. The conveyance unit 710 and the image reader 730 can be partially viewed by opening the door 702. The door 702 is provided with positioning members 703 and 704 located inside thereof. The positioning member 703 is located opposite to the conveyance unit 710 and serves to determine the housing position of the conveyance unit 710. The positioning members 704 are located opposite to the image reader 730 and serves to determine the housing position of the image reader 730.

The conveyance unit 710 is provided with a conveyance housing 711 which can be pulled out from the image reading housing 701 for performing various maintenance. The conveyance housing 711 is provided with a protrusion 712. The protrusion 712 is located opposite to the positioning member 703. Accordingly, when the door 702 is closed, the housing position of the conveyance unit 710 is determined by pressing the protrusion 712 with the positioning member 703.

The conveyance unit 710 is provided with conveying guide members 715 and 717, a spectrophotometer 790, the sheet support members 721A and 722 and the like. The conveying guide member 715 consists of a pair of upper and lower members each of which is provided with a conveyance roller 716. A sheet P is conveyed along the conveying guide member 715 by driving the conveyance rollers 716. The conveying guide member 717 consists of a pair of upper and lower members each of which is provided with conveyance rollers 718 and 719. A sheet P is conveyed along the conveying guide member 717 by driving the conveyance rollers 718 and 719. In other words, a paper path 720 for conveying a sheet P is formed by the conveying guide members 715 and 717 and the conveyance rollers 716, 718 and 719 along a sheet conveying direction K.

The spectrophotometer 790 is located in the downstream side of the reading position A of the image reader 730 to colorimetrically measure the color of an image formed on a sheet P. The spectrophotometer 790 guarantees the absolute value of the color of an image formed on a sheet P by colorimetrically measuring the color of the image formed on the sheet P. Specifically, the spectrophotometer 790 irradiates the color of an image formed on a sheet P with visible light. The spectrophotometer 790 acquires the optical spectrum of the visible light reflected from the sheet support member 722 which is located opposite to the spectrophotometer 790. The spectrophotometer 790 derives tristimulus values based on optical data which is obtained from the acquired optical spectrum. The spectrophotometer 790 calculates color values based on the tristimulus values. Specifically, the color values are represented in a predetermined color model such as an orthogonal coordinate system or a circular cylindrical coordinate system to derives color tones of an image formed on a sheet P. The sheet support member 721A and a light transmitting member 713, which is located above the sheet support member 721A, are used in association with the image reader 730.

The image reader 730 is provided with a reading housing 731 which can be pulled out from the image reading housing 701 to perform various maintenance. The reading housing 731 is provided with protrusions 732. The protrusions 732 are located opposite to the positioning members 704. Accordingly, when the door 702 is closed, the housing position of the image reader 730 is determined by pressing the protrusions 732 with the positioning members 704 respectively.

The image reader 730 reads at least either one of the main and back sides of a sheet P conveyed along the paper path 720 in a reading position A. In the case of the example shown in FIG. 1, the image reader 730 is arranged to read the main side of a sheet P. The image reader 730 is provided with the light transmitting member 713. The light transmitting member 713 is housed in the reading housing 731, and located in a position opposite to a sheet P in the reading position A. The light transmitting member 713 is provided to transmit illumination light radiated from the image reader 730 to a sheet P. Also, the light transmitting member 713 transmits incident light including reflected light which is reflected from the sheet P. Furthermore, the light transmitting member 713 transmits incident light including transmitted light which is reflected from the sheet support member 721A.

The sheet support member 721A is located opposite to the image reader 730 to support the rear surface opposite to the surface to be read of a sheet P The sheet support member 721A reflects transmitted light which is generated from illumination light radiated to a sheet P from the image reader 730 through the light transmitting member 713. The transmitted light is part of the illumination light which is radiated from the image reader 730 and transmitted through the sheet P. The reflected light is light transmitted through a sheet P and reflected from the sheet support member 721A. Incidentally, the reflected light also includes light which is not transmitted through a sheet P but reflected by the sheet P. Namely, the light quantity X of the incident light to the light transmitting member 713 includes the component of the illumination light which does not transmit through a sheet P but reflected from the sheet P and the component of the reflected light which transmits through the sheet P.

The sheet support member 721A has different opposite surfaces, which are to face the image reader 11, in accordance with the usages of these surfaces. In the case of the example shown in FIG. 5, the sheet support member 721A is hexagonal in cross section to have six surfaces which are rotated to switchingly provide one opposite surface facing the image reader 11. Specifically, there are a black surface I, a white surface II, a sheet support surface III, a white reference surface IV, a black reference surface V and a surface VI which are switchingly positioned as an opposite surface facing the image reader 11. More specifically, the black surface I is used to support the rear surface opposite to the surface to be read of a sheet P, when reading the profile of the sheet P and the printing position of an image, to provide the background of the sheet P which is black. The white surface II is used to support the rear surface opposite to the surface to be read of a sheet P, when reading the color of an image printed on the sheet P, to provide a surface which is white for reflecting the light transmitted through the sheet P. The sheet support surface III is used to support the back side of a sheet P opposite to the reading face of the sheet P, when a sheet P is not read itself, only for passing the sheet P.

The white reference surface IV is used to calibrate the read color of the image reader 11 and formed of a white reference color. The black reference surface V is used to detect deposits such as dust adhered to the light transmitting member 713 of the image reader 11 and formed of a black reference color. In other words, the white reference surface IV and the black reference surface V are used, while no sheet P is conveyed, to perform maintenance of the image reader 11 such as calibration of the read color, detection of deposits or the like. The surface VI is located as the opposite surfaces to the image reader 11 in a home position in which no operation is performed.

Incidentally, the sheet support member 721A does not necessarily provide all the above described surfaces as the opposite surface to the image reader 11. It is only required that the sheet support member 721A has at least the white surface II and the white reference surface IV.

The image reader 730 is provided with the lighting device 734, a mirror assembly 735, an image forming lens array 736, a light detector 737 and the like. The lighting device 734 is located in the lower portion of the inside of the reading housing 731 to radiate illumination light through the light transmitting member 713 by arranging the light transmitting member 713 in a projected portion of the reading housing 731. The mirror assembly 735 and the image forming lens array 736 are arranged to form a reduction optical system which leads the incident light transmitted through the light transmitting member 713 to the light detector 737. The light detector 737 is located in the inside of the reading housing 731 above the lighting device 734 to detect incident light. Also, the light detector 737 incorporates a solid stage imaging device such as a CCD or a CMOS which can detect light emitted from the image forming lens array 736 and convert the detected light to an electrical signal which is output through an output terminal which is not shown in the figure. More specifically, the solid stage imaging device is an imaging device which performs photoelectrical conversion for each picture element. A plurality of solid stage imaging devices are one-dimensionally arranged in the width direction of a sheet P, i.e., in the main scanning direction as a line image sensor. The reading area of the plurality of solid stage imaging devices of the image reader 730 is determined to cover the maximum width of sheets P which can be supplied from the image forming apparatus 5 or the like. The image reader 730 reads the image formed on a sheet P as a two-dimensional image to obtain the read values of colors of the image by repeating operation of reading image data from one line along the width direction of the sheet P in synchronization with the operation of conveying the sheet P which is passed through the reading position A. Incidentally, the image forming system 1 can correct the read values of colors of an image read by the image reader 730 based on the color values of the image obtained by the spectrophotometer 790.

The lighting device 734 is provided, in addition to the light transmitting member 713, with a lighting housing 7341, a light source 7342 and a light guide member 7344 to form an opening 7345. The lighting housing 7341 is used to house the light source 7342, the light transmitting member 713 and the light guide member 7344. The light source 7342 is composed of a halogen lamp, an LED or the like. If the light source 7342 is composed of an LED, a power semiconductor module is provided for controlling the LED. The halogen lamp and the power semiconductor module generate heat when driven. The light guide member 7344 is arranged along the main scanning direction and leads the light of the light source 7342 to a sheet P as illumination light through the light transmitting member 713. Also, the light transmitting member 713 serves to transmit incident light. The incident light transmitted through the light transmitting member 713 is directed to the mirror assembly 735 through the opening 7345. Incidentally, the light transmitting member 713 is made of a light transmitting material such as a glass or a resin. Furthermore, the light source 7342 and the light guide member 7344 can be integrally formed.

The reading housing 731 is provided with a pair of drawer guide 733. The drawer guide 733 is designed such that it can be drawn from the image reading housing 701. The drawer guides 733 maintain the distance between the light transmitting member 713 and the sheet support member 721A to be greater than a reading distance lower limit C. The reading distance lower limit C is a distance with which the reading accuracy of the image reader 730 can be maintained, and is the minimum distance determined by taking into consideration the vibration of the reading housing 731 occurring when the image reader 730 is withdrawn.

Each of the drawer guide 733 is provided with a drawer member 7331 and a holding member 7332. The drawer members 7331 support the reading housing 731 and can be drawn together with the reading housing 731. The holding members 7332 hold the drawer members 7331 in order that the drawer members 7331 can be drawn along the drawing direction M of the reading housing 731, and keeps the height of the reading housing 731. In other words, the drawer guide 733 is provided in the form of a rail structure composed of the drawer member 7331 and the holding member 7332. The holding members 7332 are fixed to support members 706. The support members 706 are fixed to the image reading housing 701. Accordingly, the holding members 7332 have a fixed positional relationship to the image reading housing 701 through the support members 706.

The lighting device 734 generates heat when radiating irradiation light. Also, after an image is thermally fixed to a sheet P, the sheet P is heated itself. If such heat is transferred to the image reader 730, the temperature of the image reader 730 rises due to the heat accumulated in the image reader 730. The rising temperature of the image reader 730 hinders the temperature of the sheet P itself from lowering so that the ambient temperature of the spectrophotometer 790 also rises. The color values of an image as the colorimetric measurement result of the spectrophotometer 790 is changed if the spectrophotometer 790 is influenced by thermochromism which is a phenomena in which color is changed due to a change in temperature such as sheet temperature or ambient temperature of a sheet P during colorimetric measurement. Accordingly, unless influence of heat is reduced, it is impossible to maintain colorimetric accuracy of the spectrophotometer 790. In order to reduce influence of heat, heat accumulated in the image reader 730 has to be dissipated. Heat can be dissipated by natural convection or forced convection.

Natural convection can be caused by the use of the drawer guides 733. The drawer guides 733 can transfer heat, which is generated when radiating illumination light, to the outside of the reading housing 731. Specifically speaking, the drawer guides 733 are formed of a metallic material. Also, the drawer guides 733 may be coated with a material having a higher thermal conductivity than a high thermal conductivity resin such as polyimide resin, polycarbonate resin or polybutylene telephthalate resin. Namely, the drawer guides 733 can easily dissipate heat accumulated in the image reader 730 by its material characteristics.

On the other hand, forced convection can be caused by the use of a cooler 714 and an air blower 705. The cooler 714 is provided in the image reading housing 701. Specifically, the cooler 714 is located between the spectrophotometer 790 and the reading housing 731 to cool the lighting device 734. The cooler 714 is composed, for example, of a fan, and the blowing amount of the fan is adjusted by driving the fan to control the ambient temperature of the lighting device 734.

The air blower 705 is provided in the image reading housing 701. Specifically, the air blower 705 is located between the image reader 730 and an exhaust port 709 formed through the image reading housing 701 to discharge heat transferred from the drawer guides 733 to the outside of the image reading housing 701. The air blower 705 is composed, for example, of a fan, and the blowing amount of the fan is adjusted by driving the fan to discharge heat in the image reading housing 701 to the outside through the exhaust port 709. Meanwhile, in FIG. 5, it is omitted to illustrate the air blower 705, the support members 706 or the like, and provide a side view of the image reading housing 701.

Namely, heat accumulated in the image reader 730 can be dissipated by combining natural convection through the drawer guides 733 and forced convection with the cooler 714 and the air blower 705, so that a sheet P and the spectrophotometer 790 can be placed a situation near a room temperature when colorimetrically measuring the color of an image with the spectrophotometer 790.

Also, the image reader 730 is heavy because of the lighting device 734, the mirror assembly 735, the image forming lens array 736 and the like in the reading housing 731. Accordingly, when the image reader 730 is pulled out, the image reader 730 is lowered by its weight so that there is a fear that the light transmitting member 713 comes in contact with the sheet support member 721A. However, since the drawer guides 733 are made of a metallic material, the strength of the drawer guides 733 is sufficiently high. When the image reader 730 is pulled out, therefore, the lowering of the image reader 730 is restricted to prevent the contact between the light transmitting member 713 and the sheet support member 721A. As a result, it is possible to prevent the light transmitting member 713 from having flaws or the like.

As has been discussed above, in accordance with the image forming system 1 of the present embodiment, the drawer guides 733 maintain the distance between the light transmitting member 713 and the sheet support member 721A to be greater than a reading distance lower limit C, and transfers heat, which is generated when radiating illumination light, to the outside of the reading housing 731, so that the lowering of the image reader 730 can be restricted while preventing the temperature of the spectrophotometer 790 from rising, and therefore it is possible to maintain the colorimetric accuracy of the spectrophotometer 790 and facilitate the maintenance of the image reader 730.

Also, in accordance with the image forming system 1 of the present embodiment, since the drawer guides 733 are formed of a metallic material to have a high thermal conductivity, it is possible to accelerate natural convection of heat generated from the drawer guides 733. Furthermore, since the drawer guides 733 are formed of a metallic material, the strength of the drawer guides 733 is so high that the lowering of the image reader 730 can be significantly restricted.

Furthermore, in accordance with the image forming system 1 of the present embodiment, since the drawer guides 733 are coated with a high thermal conductivity resin, it is possible to prevent corrosion of the drawer guides 733 formed of a metallic material and improve the durability of the drawer guides 733.

Furthermore, in accordance with the image forming system 1 of the present embodiment, since the drawer guides 733 are provided with the drawer members 7331 and the holding members 7332, the drawer guides 733 are configured to slide so that the operation of pulling out the image reader 730 is facilitated.

Furthermore, in accordance with the image forming system 1 of the present embodiment, since the drawer guides 733 are located above the spectrophotometer 790 and the lighting device 734, it is possible to effectively dissipate heat of air which is elevated by heat.

Furthermore, in accordance with the image forming system 1 of the present embodiment, since the lighting device 734 is cooled by the cooler 714, it is possible to accelerate forced convection around the lighting device 734 and therefore to lower the ambient temperature of the lighting device 734.

Furthermore, in accordance with the image forming system 1 of the present embodiment, since the air blower 705 releases heat transferred by the drawer guides 733 to the outside of the image reading housing 701, it is possible to accelerate forced convection of heat accumulated in the inside of the image reading housing 701 and therefore further to lower the inner temperature of the image reading housing 701.

Furthermore, in accordance with the image forming system 1 of the present embodiment which is provided with the image forming apparatus 5 and the image reading apparatus 7 located in the downstream side of the image forming apparatus 5, an image formed on the entirety of a sheet P can be read and it is possible to accurately correct color of the image formed on the sheet P in association with the spectrophotometer 790 by passing only once the sheet P through the paper path 720.

Embodiment 2

This embodiment 2 includes an image reader 730 having the similar configuration and functions as that of the embodiment 1. On the other hand, the embodiment 2 is implemented with a conveyance unit 780 which has a different structure than the conveyance unit 710 of the embodiment 1, and provided further with an image reader 760. In the description of the embodiment 2, the explanation of the similar configuration and functions to in the embodiment 1 will be dispensed with.

Figure 7:
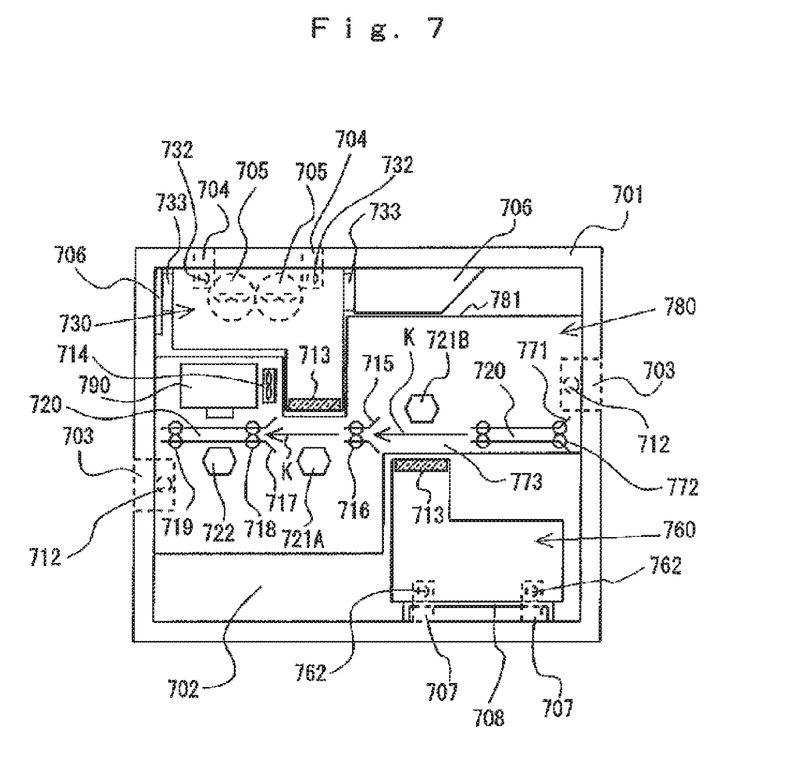
FIG. 7 is a view schematically showing an exemplary structure of the image reading apparatus 7 in accordance with the embodiment 2.
Figure 8:
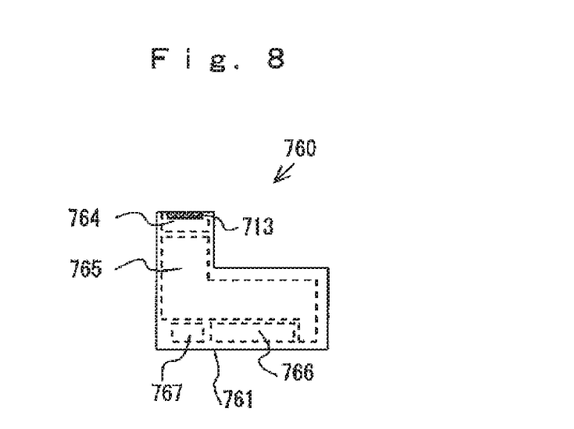
FIG. 8 is a schematic view for showing an example of the internal structure of the image reader 760 in accordance with the embodiment 2.

FIG. 7 is a view schematically showing an exemplary structure of the image reading apparatus 7 in accordance with the embodiment 2. FIG. 8 is a schematic view for showing an example of the internal structure of the image reader 760 in accordance with the embodiment 2. The image reading apparatus 7 is provided with the image reading housing 701, the conveyance unit 780, the image reader 760, the image reader 730 and the like. The image reading housing 701 houses the image reader 730, the image reader 760 and the conveyance unit 780. The image reading housing 701 is provided with a door 702 which can be opened and closed in an opening and closing direction L in the same manner as shown in FIG. 6. The conveyance unit 780, the image reader 760 and the image reader 730 can be partially viewed by opening the door 702. The door 702 is provided further with positioning members 707 in the inside thereof in addition to the positioning members 703 and 704. The positioning members 707 are located opposite to the image reader 760 and serves to determine the housing position of the image reader 760.

The conveyance unit 780 is provided with a conveyance housing 781 which can be pulled out from the image reading housing 701 for performing various maintenance. The conveyance housing 781 is provided with a protrusion 712. Incidentally, the protrusion 712 has the similar configuration and functions as in the embodiment 1, and therefore no redundant description is repeated.

The conveyance unit 780 is provided further with a conveying guide member 771 and a sheet support member 721B in addition to the conveying guide members 715 and 717, the spectrophotometer 790 and the sheet support members 721A and 722. The conveying guide member 771 consists of a pair of upper and lower members each of which is provided with a conveyance roller 772. A sheet P is conveyed along the conveying guide member 771 by driving the conveyance rollers 772. In other words, a paper path 720 for conveying a sheet P is formed by the conveying guide members 715, 717 and 771 and the conveyance rollers 716, 718, 719 and 772 along a sheet conveying direction K. Meanwhile, the sheet support members 721A and 721B are collectively referred to as the sheet support member 721.

The image reader 760 is provided with a reading housing 761 which can be pulled out from the image reading housing 701 to perform various maintenance. The reading housing 761 is provided with protrusions 762. The protrusions 762 are located opposite to the positioning members 707. Accordingly, when the door 702 is closed, the housing position of the image reader 760 is determined by pressing the protrusions 762 with the positioning members 707 respectively. The image reader 760 is placed on a pedestal 708. The pedestal 708 is formed, for example, by processing a metallic plate and determines the position of the image reader 760 in the height direction. Incidentally, the image reader 760 is provided with a lighting device 764, a mirror assembly 765, an image forming lens array 766, a light detector 767 and the like, which are housed in the reading housing 761. The image reader 760 has the similar configuration and functions as the image reader 730, and therefore no redundant description is repeated.

The image reader 760 reads at least either one of the front and back sides of a sheet P conveyed along the paper path 720 in a reading position A. In the case of the example shown in FIG. 7, the image reader 760 is arranged below the paper path 720 to read the back side of the sheet P. The image reader 730 is arranged, in the case of the example shown in FIG. 7, above the paper path 720 to read the front side of the sheet P. Incidentally, the image reader 730 and the image reader 760 are referred to as the image reader 800 unless particular one is specified. The image reader 800 is provided in two locations in the upstream side of the spectrophotometer 790. Namely, the image reader 760 is the image reader 800 provided in one of the two locations in the upstream side of the spectrophotometer 790, and the image reader 730 is the image reader 800 provided in the other of the two locations in the upstream side of the spectrophotometer 790.

Accordingly, the reading result of the image reader 760 is used, for example, to check misalignment between images printed on the front and back sides of the sheet P, the existence of an extraordinary image or the like. On the other hand, the image reader 730 reads an image printed on a sheet P such as patches. While a sheet P is conveyed, the image reader 730 reads the color of an image formed on the sheet P along the direction perpendicular to the moving direction of the sheet P, i.e., the main scanning direction.

In other words, an image formed on the entirety of a sheet P can be read by the use of the image readers 730 and 760, while performing various checks of the sheet P, it is possible to accurately correct the position of the image formed on the sheet P and the color of the image formed on the sheet P in association with the spectrophotometer 790 by passing only once the sheet P through the paper path 720.

The information processing system 1 have been explained based on the embodiments in accordance with the present disclosure. However, it is not intended to limit the present disclosure to the precise form described, and obviously many modifications and variations are possible without departing from the spirit and scope of the invention.

For example, while the drawer guide 733 is composed of one drawer member 7331 and one holding member 7332 in the example of the present embodiments, the present disclosure is not limited thereto. For example, the drawer guide 733 can be composed of a plurality of drawer members 7331 and one holding member 7332. In this case, the image reader 730 can be pulled out through the plurality of drawer members 7331 in a stepwise manner. Specifically, for example, three drawer members 7331 can be provided in order to pull out the image reader 730 in three steps.

Also, while the drawer guide 733 is formed on the lateral side of the image reader 730 in the case of the present embodiment, the present disclosure is not limited thereto. For example, the drawer guide 733 can be formed on the upper side of the image reader 730 in order that the image reader 730 is suspended from the upper side and can be freely pulled out.

Furthermore, while the drawer guide 733 is provided in the form of a rail structure composed of the drawer member 7631 and the holding member 7632 in the case of the present embodiment, the present disclosure is not limited thereto. For example, the drawer guide 733 can be provided in the form of a linear structure in which the drawer member 7631 can linearly move on the holding member 7632. Furthermore, for example, the drawer guide 733 can be provided in the form of a roll rail structure in which the drawer member 7631 can be freely pulled out with rolls installed on the holding member 7632. Furthermore, for example, the drawer member 7331 can be composed of a plurality of elements in the form of a tilted rail structure in which the rail can be freely tilted. Incidentally, while the drawer member 7331 and the holding member 7332 are not limited to particular structures and profiles, for example, the drawer member 7331 and the holding member 7332 can be designed in the form of a DIN rail. Also, the drawer member 7331 or the holding member 7332 can be L-shaped.

Furthermore, while the image reader 760 is not provided with the holding member 733 and so forth unlike the image reader 730 in the case of the present embodiment, the present disclosure is not limited thereto. For example, like the image reader 730, the image reader 760 can be provided with the holding member 733 and so forth.

Furthermore, while the cooler 714 is composed of a fan in the case of the present embodiment, the present disclosure is not limited thereto. For example, the cooler 714 may be composed of a piping unit which is installed around the lighting device 734 to cool the lighting device 734 as a result of heat exchange of heat generated by the lighting device 734 through a cooling medium. Also, heat generated by the lighting device 734 can be released to the outside of the image reading housing 701 by driving the fan as the air blower 705 to depressurize the inside of a duct forming a route through which air flows from the exhaust port 709 to the lighting device 734. Furthermore, heat generated by the lighting device 734 can be released to the outside of the image reading housing 701 by driving the fan as the cooler 714 to depressurize the inside of a duct forming a route through which air flows from the cooler 714 to the exhaust port 709.

Also, while the image forming system 1 is provided with the paper feed apparatus 3 and the finisher 9 in the case of the present embodiment, the present disclosure is not limited thereto. For example, the image forming system 1 can include only the image forming apparatus 5 and the image reading apparatus 7. Furthermore, in the image forming system 1, the image forming apparatus 5 and the image reading apparatus 7 can be integrally formed as one system rather than separately formed as two apparatuses.

Furthermore, while the image forming apparatus 5 forms an image on a sheet P by an electrophotographic system in the case of the present embodiment, the present disclosure is not limited thereto. For example, the image forming apparatus 5 can be designed to form an image on a sheet by another system which supplies heat to the sheet P, such as an inkjet system or a heat transfer system.

Furthermore, while the sheet support member 721 is rotated to switch the opposite surface formed thereon to face the image reader 11 in the case of the present embodiment, the present disclosure is not limited thereto, but the sheet support member 721 is made of a flat plate on which are formed a black surface I, a white surface II, a sheet support surface III, a white reference surface IV, a black reference surface V and a surface VI. In the case where the sheet support member 721 is made of a flat plate, the opposite surface facing the image reader 11 can be switched by moving the flat plate in a parallel direction to use any one of the black surface I, the white surface II, the sheet support surface III, the white reference surface IV, the black reference surface V and the surface VI.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image reading apparatus which reads an image on a sheet, comprising:
   a paper path along which the sheet is conveyed;
   an image reader which reads at least one of front and back sides of the sheet conveyed along the paper path in a reading position;
   a sheet support member which is located opposite to the image reader to support a rear surface opposite to a surface to be read of the sheet;
   a spectrophotometer which colorimetrically measures color of an image formed on the sheet; and
   an image reading housing which accommodates the image reader and the spectrophotometer, the image reader comprising:
- a reading housing which houses a lighting device to radiate illumination light on the sheet; and
- a drawer guide which supports the reading housing such that the reading housing can be drawn from the image reading housing, wherein the drawer guide transfers heat, which is generated when radiating the illumination light, to outside of the reading housing.

2. The image reading apparatus of claim 1, wherein the drawer guide is formed of a metallic material.

3. The image reading apparatus of claim 2, wherein the drawer guide is coated with a material having a higher thermal conductivity than a high thermal conductivity resin.

4. The image reading apparatus of claim 1, wherein the drawer guide comprises:
- a drawer member which supports the reading housing and can be drawn together with the reading housing; and
- a holding member which holds the drawer member such that the drawer member can be drawn along a drawing direction of the reading housing, and which keeps a height of the reading housing.

5. The image reading apparatus of claim 1, wherein the drawer guide is located above the spectrophotometer and the lighting device.

6. The image reading apparatus of claim 5, wherein the image reader further comprises:
- a cooler which is provided in the image reading housing to cool the lighting device.

7. The image reading apparatus of claim 1, further comprising:
- an air blower provided in the image reading housing to discharge heat transferred from the drawer guide to outside of the image reading housing.

8. The image reading apparatus of claim 1, wherein the image reader comprises a first image reader and a second image reader, wherein the first image reader is located on an upstream side of the spectrophotometer along a sheet conveying direction and is located below the paper path to read the back side of the sheet, and wherein the second image reader is located on an upstream side of the spectrophotometer along a sheet conveying direction and is located above the paper path to read the front side of the sheet.

9. An image forming system comprising:
- an image forming apparatus; and
- the image reading apparatus as recited in claim 1, the image reading apparatus being located on a downstream side of the image forming apparatus along a sheet conveying direction.

10. The image reading apparatus of claim 4, wherein the holding member is fixed to the image reading housing.

11. The image reading apparatus of claim 1, wherein the image reader further comprises:
- a light transmitting member which is housed in the reading housing, and which is located at a position opposite to the sheet in the reading position to transmit the illumination light and transmit incident light including reflected light which is reflected from the sheet; and wherein the drawer guide maintains a distance between the light transmitting member and the sheet support member to be greater than a reading distance lower limit.

12. The image reading apparatus of claim 1, wherein the drawer guide is provided on a lateral side of the image reader and is provided in the form of a rail structure.

13. The image reading apparatus of claim 1, wherein the image reader opposes the paper path and is located on a same side of the paper path as the spectrophotometer.

14. The image reading apparatus of claim 1, wherein the spectrophotometer calculates color values.

15. The image reading apparatus of claim 1, wherein read values of colors of the image read by the image reader are corrected based on color values of the image obtained by the spectrophotometer.

* * * * *